(12) United States Patent
Rehmert, Jr.

(10) Patent No.: US 7,191,796 B1
(45) Date of Patent: Mar. 20, 2007

(54) DUAL OUTLET AIR VALVE

(76) Inventor: Paul E. Rehmert, Jr., P.O. Box 3038, Idaho Springs, CO (US) 80452

( * ) Notice: Subject to any disclaimer, the term of this patent is extended or adjusted under 35 U.S.C. 154(b) by 24 days.

(21) Appl. No.: 10/641,840

(22) Filed: Aug. 15, 2003

(51) Int. Cl.
*F16K 15/20* (2006.01)
(52) U.S. Cl. ............... 137/512.1; 137/224; 137/543.13
(58) Field of Classification Search ............... 137/223, 137/224, 512.1, 601.2, 543.13; 152/415, 152/427, 429
See application file for complete search history.

(56) References Cited

U.S. PATENT DOCUMENTS

| | | | | |
|---|---|---|---|---|
| 205,553 A | * | 7/1878 | Hutchinson | 137/543.13 |
| 469,853 A | * | 3/1892 | Gibson | 137/543.13 |
| 528,360 A | * | 10/1894 | Calswell | 137/512.1 |
| 1,006,159 A | * | 10/1911 | Wetherholt | 137/224 |
| 1,243,521 A | * | 10/1917 | Henemire | 137/224 |
| 1,420,245 A | * | 6/1922 | Dougherty | 137/224 |
| 2,022,196 A | * | 11/1935 | Bruno | 137/224 |
| 2,080,373 A | * | 5/1937 | Marvin | 122/504.3 |
| 3,830,249 A | * | 8/1974 | Fleenor et al. | 137/224 |
| 4,015,623 A | * | 4/1977 | Wanstreet | 137/224 |
| 4,186,872 A | * | 2/1980 | Bland et al. | 137/512.1 |
| 5,054,511 A | * | 10/1991 | Tuan et al. | 137/224 |
| 5,190,072 A | * | 3/1993 | McAnally | 137/543.13 |

* cited by examiner

*Primary Examiner*—John Rivell

(57) ABSTRACT

The dual outlet air valve is design feature that would greatly enhance the convenience of the standard valve stem design. In order to accomplish this the dual outlet air valve comprises a multi-port design whereby air can be released or injected through more then one port. The sealing and release of air for each port is controlled by a novel mechanism comprising a spring mounted plug. This spring is helical and surrounds a rod. One end of the rod is attached to a plug that is held in alignment with a hole defined by a wall formed to separate the upper portion of the port from the lower portion. The other end of the rod passes through a partition formed to define a hole at its center. The spring is larger in diameter then the center hole of the partition and is seated between the partition and the plug. The partition is threaded on its circumference and is seated on threads defined by the inner surface of the port. Rotating the partition causes it to move up or down and alters the compression of the spring.

20 Claims, 4 Drawing Sheets

DUAL OUTLET AIR VALVE

BACKGROUND OF THE INVENTION

1. Field of the Invention

The present invention relates to a device designed to provide a tire air valve with multiple ports in order to simultaneously admit and release air for a variety of purposes.

2. Description of the Prior Art

One of the most crucial tasks in the regular maintenance of a vehicle is checking the air pressure of tires and adding air to attain the proper pressure. Most tires have a recommended air pressure that the user should maintain to optimize performance and safety. In addition, tires that are not maintained at the proper pressure will wear faster, thus making them less economical. Most vehicle owners perform this maintenance themselves since it is a relatively simple task and most service stations provide only self-service air facilities. In the usual process, air is injected into the tire and then the pressure is checked intermittently, using a separate tire pressure-measuring device. This process is repeated until the proper pressure is attained. The procedure can be cumbersome and slows the process considerably. This system is required however with the current standard design for tire air valves since there is only one port. If, however there were two ports to access the air in the tire, air could be inserted or released through one port while the other port could be used for gauging the pressure of the air in the tire.

In the prior art there are systems for airing tires and gauging the air pressure through a single port. These designs require several mechanisms that may deteriorate with use and often are relatively inaccurate. Thus a valve design that includes two ports would greatly expand the possibilities for air supply systems, making dual task systems simpler and improving accuracy. The result would be a far more convenient design for air valves.

U.S. Pat. No. 3,230,968 to William D. Struby discloses a design for a valve stem that incorporates a pressure measuring device. This design uses a single port for air while the present invention discloses a design for a valve stem with two air ports. This lends itself to the common problems associated with using a single air port for both air gauge and air supply. Another distinction from the Struby '968 patent in the present invention is the sealing mechanism for the air ports. The present invention uses a screw cap mechanism that applies force to create a seal and can be manipulated by a key design. The Struby '968 design uses a spring that presses a seal against an orifice to cut off air flow. This seal is broken when a member is pressed to contract the spring and break the seal. Any inadvertent pressure applied to the spring can break this seal whereas the present device must be intentionally adjusted to allow the seal to be broken.

U.S. Pat. No. 3,450,147 to Donald A. Webb, is a design for a tire valve that incorporates an addition to the standard valve stem design. This design incorporates a single port design that is substantially different from the two-port design of the present invention. A plug that is mounted on a spring seals the port in the Webb '147 design. Like most designs in the prior art this seal is broken by applying pressure to a member that contracts the spring and forces the plug away from the mouth of the port. The present invention instead has a screw cap that must be adjusted to a point where the spring-mounted plug will be pressed away by the air within the tire. This eliminates the risk of inadvertent release of air due to accidental pressure on the spring. It also prevents the presence of a slow leak due to declining effectiveness of the spring.

U.S. Pat. No. 4,310,014 to James E. Parker is a patent for a mechanism that can be incorporated into the typical valve stem design to indicate when a tire has fallen below the appropriate pressure. An indicator is calibrated to an internal spring that will vary in contraction according to the pressure within the tire. This design employs a single port for inserting air and monitoring tire pressure. The present invention employs a dual port design that allows for a more accurate means for monitoring the air pressure within the tire. Also the Parker patent '014 uses the standard spring loaded seal while the present invention incorporates an adjustable cap to apply fixed pressure to ensure a tight seal.

U.S. Pat. No. 4,445,527 to Richard C. Leimbach describes a device that may be incorporated on the exterior end of the standard valve stem. This device incorporates a spring mounted seal that may be broken if the tire pressure exceeds a level high enough to contract the spring. As with all the designs in the prior art a single port is used in this design. Also there is no mechanism in the Leimbach '527 patent like the screw cap of the present invention for adjusting external pressure to ensure the seal of the valve.

U.S. Pat. No. 4,883,107 to Kenneth B. Keys discloses a variation of a device that may be incorporated on the exterior end of the standard valve stem. The purpose of this mechanism is to allow the user to insert air until the pressure exceeds the appropriate level, at which time the mechanism will release the air from the tire until the correct pressure is attained. This variation does not eliminate the two distinct features of the present invention from the prior art. Firstly only one port for the valve stem is used. Secondly no feature is included to adjust the pressure applied to the spring in order to ensure the seal.

U.S. Pat. No. Des. 419,085 to Robert Prus is a design patent for an air pressure indicator that may be incorporated to a valve stem. It has no impact on the prior art regarding the number of ports provided. It also does not incorporate a mechanism for securing the seal formed by the spring-mounted plug of the standard valve stem design.

Therefore a need exists for a novel and enhanced method for accessing and adjusting the air supply within devices designed to retain air. This need includes adaptability to many devices for measuring said air supply. In this respect, the dual outlet air valve according to the present invention substantially departs from the conventional concepts and designs of the prior art, and in doing so provides an apparatus primarily developed for the purpose of access to the air supply of air retaining devices.

SUMMARY OF THE INVENTION

In view of the foregoing disadvantages inherent in the known types of air supply inlets now present in the prior art, the present invention provides an improved combination of reliability and versatility, and overcomes the abovementioned disadvantages and drawbacks of the prior art. As such, the general purpose of the present invention, which will be described subsequently in greater detail, is to provide a new and improved dual outlet air valve which has all of the advantages of the prior art mentioned heretofore and many novel features that result in a dual outlet air valve which is not anticipated, rendered obvious, suggested, or even implied by the prior art, either alone or in combination thereof.

In furtherance of this objective, the dual outlet air valve comprises a plurality of ports interfaced between the interior of devices designed to retain air and the exterior of said devices. The ports being juxtaposed so as to allow the simultaneous performance of multiple air supply related tasks from the same location.

There has been outlined, rather broadly, the more important features of the invention in order that the detailed description thereof that follows may be better understood and in order that the present contribution to the art may be better appreciated.

The present invention may in addition comprise an adjustable brace the position of which may be modified. Said brace provides resistant force against a plug. Said plug provides a seal that prevents the release of air from the interior of an air-retaining device to the exterior of that device. Said resistant force prevents the breaking of said seal created by said plug.

An additional aspect of the dual outlet air valve is a cylindrical housing surrounding said ports and designed to receive the standard commercial air supply device and threaded to allow the mounting of a cap or additional air supply devices.

In order to facilitate the manipulation of the abovementioned brace said braces might comprise a plurality of holes or slots for receiving a key.

Interposed between said brace and said plug may sit a spring that may be compressed by said brace so that said spring will provide force to create said seal created by said plug.

In coordination with the abovementioned brace the present invention may in addition comprise a key that includes prongs that may be inserted within said holes or slots in said brace.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dual outlet air valve that has all of the advantages of the prior art and none of the disadvantages.

It is another object of the present invention to provide a new and improved dual outlet air valve that may be easily and efficiently manufactured and marketed.

An even further object of the present invention is to provide a new and improved dual outlet air valve that has a low cost of manufacture with regard to both materials and labor, and which accordingly is then susceptible of low prices of sale to the consuming public, thereby making such dual outlet air valve economically available to the buying public.

Still another object of the present invention is to provide a new dual outlet air valve that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
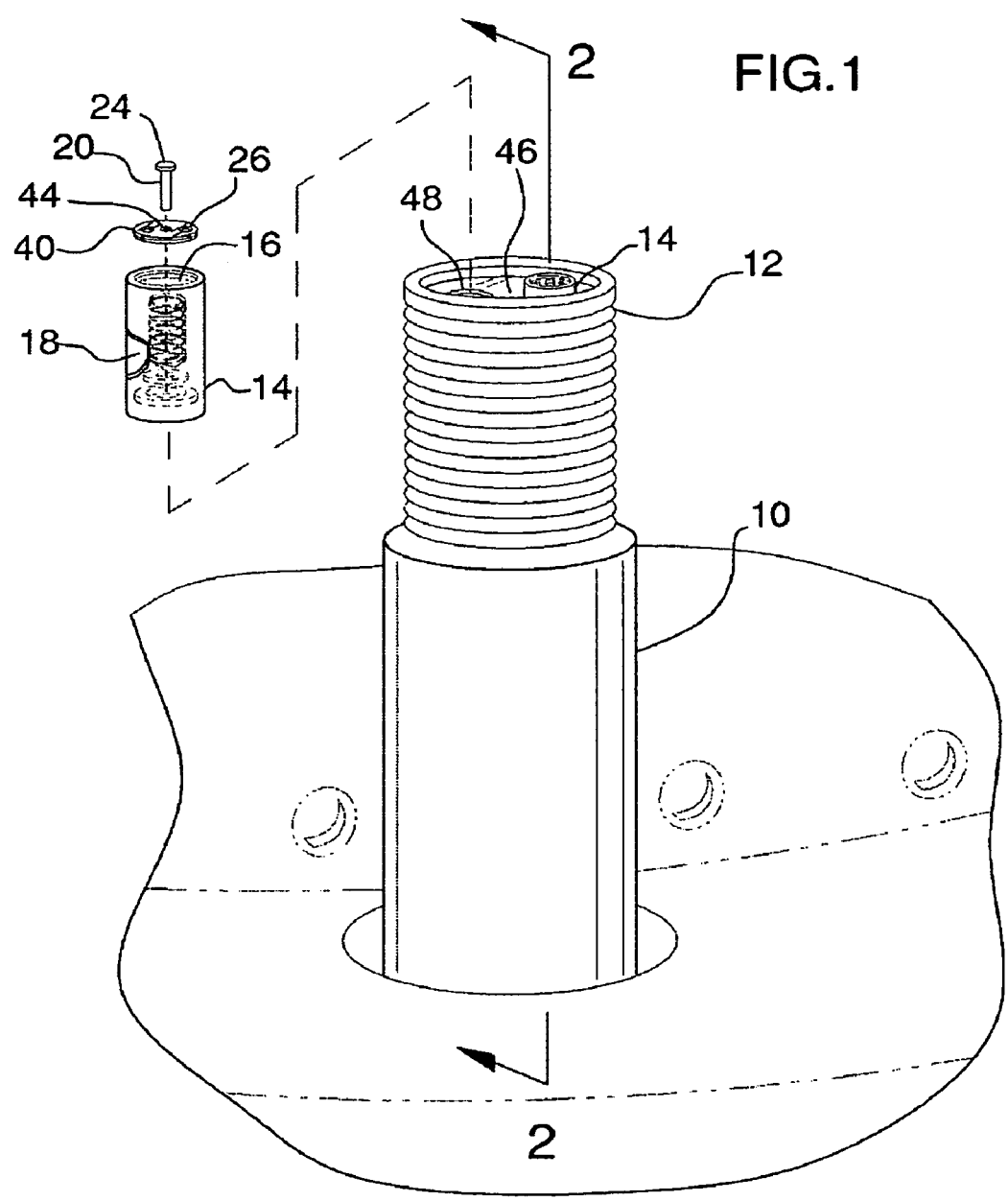
FIG. 1 is a front perspective view of the preferred embodiment of the dual outlet valve of the present invention.

Referring now to the drawings, and particularly to FIGS. 1–4, a preferred embodiment of the dual outlet air valve of the present invention is shown and generally designated by the reference numeral 10.

In FIG. 1, a front perspective view of a new and improved dual outlet air valve 10 of the present invention for supplying and monitoring air supply is illustrated and will be described. Shown is a standard cylindrical housing 12 of a typical tire stem that is mounted on a tire. Located at the opening of said housing are the exterior ends of two ports 14. Said ports 14 are cylindrical and are formed to define an opening 16 at said exterior end and a barrel 18 passing through to a second opening at the interior end of said port. Said interior end of said port 14 is mounted on a partition 46 formed to define two holes 48 and to enclose the remaining inner diameter of said valve stem. Said interior ends of said ports 14 are mounted over said holes 48 in said partition 46 of said valve stem 12. Attached to said ports 14 are circular discs 40 in a manner whereby the position of said discs 40 may be adjusted and said discs occupy said opening 16 of said ports. Said discs 40 are formed to define a hole at the center 44. Passing through said hole is a rod 20 that comprises a first and a second end wherein said first end passes through said hole 44 and said second end is attached to a plug 22. Attached to said first ends of said rod 20 is a disc shaped head 24 the diameter of which is greater then the diameter of said center hole 44 of said discs. Said discs 40 are also formed to define a plurality of holes 26 outside the perimeter of said center hole 44.

Devices designed to access said air valve may either fit over said valve stem 12 or thread thereto. Said devices would have air supply or pressure-measuring devices that would be designed to mate with the diameter of said ports 14. The air supply portion of the device would lift the disc shaped head 24 of one of the ports 14, allowing pressurized air from the air supply portion to pass through the hole 42 within that first port 14. Once the air pressure within the tire exceeds the force exerted by the spring 30 within the second port 14, plug 22 within the second port 14 is lifted, permitting measurement of the air pressure within the tire. This measurement can be used to calibrate various positions of disc 40 within the second port 14 so that the user can set the tire's maximum air pressure. The connection points of the device to access the air valve could then be reversed so that the disc 40 within the first port 14 could be calibrated as well. Said ports 14 may be made of a variety of easily molded materials such as plastic or metal that would have rigidity but would be cheap and easy to produce. Said disc 40 may also be made of metal or plastic.

Figure 2:
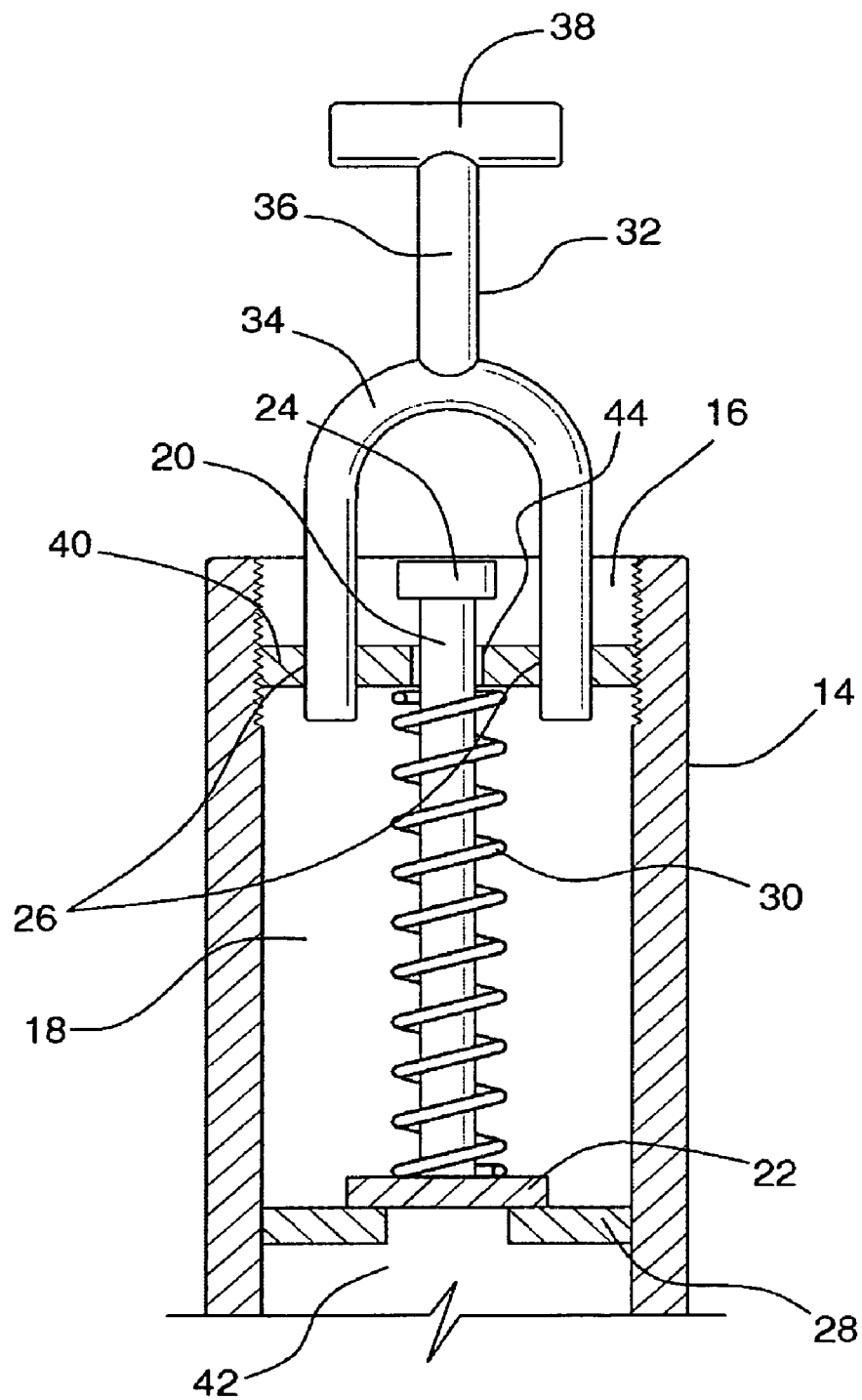
FIG. 2 is a side sectional view of a port of the present invention where the key is inserted in the brace and the port is sealed.

In FIG. 2, a sectional view of one of said ports 14 is shown. The present invention comprises a disc shaped plug 22 that comprises a first and a second surface. The plug 22 shown here is in a sealed position and may be made of a material such as rubber that would conform to a surface under pressure. Said plug 22 is attached to said second end of said rod 20. In the sealed position said first surface of said plug 22 is flush against a partition 28. Said partition 28 is formed to define a hole 42, the diameter of which is smaller then the diameter of said plug 22. When said plug 22 is flush against said partition 28 said port 14 is sealed to prevent the release of air through said port. Attached to said second surface of said plug 22 is said second end of said rod 20. Surrounding said rod is a spring 30. Said spring 30 comprises a first and a second end. Said first end is flush against said disc 40. Said second end of said spring 30 is flush against said second surface of said plug 22. When said spring 30 is contracted its force will press against said plug 22 to form a seal against said hole 42 in said partition 28. Therefore when said disc 40 is positioned so that said spring 30 is contracted between said disc 40 and said second surface of said plug 22, said plug will be pushed towards said partition 28. If said force exceeds the force created by the pressure of the air on the opposite said of said partition 28 then said plug 22 will be sealed against said partition and air will not escape. If said force due to air pressure exceeds the force of said spring 30 then said plug 22 will be pushed away from said partition 28 and air will be released through said port 14. Said disc comprises threads on its circumference.

The top inner surface of said port 14 is also threaded so that said disc 40 will mount within said port and its position may be adjusted by rotation in a screw-like fashion. Thus if the user wishes for said disc to hold said spring in a contracted position that will provide sufficient force to maintain said seal, then they will rotate said brace to a lower position. If air needs to be released then said disc might be rotated to a higher position. Said disc is formed to define two holes 26 said holes receive two prongs of a key 32. Said key 32 comprises a U-shaped member 34 wherein said member comprises said two prongs. A rod shaped member 36 is attached at one end to the base of said U-shaped member 34 and at the other end to a cylindrical handle 38 where the axis of said handle is perpendicular to the axis of said rod shaped member. The user may insert said prongs of said key 32 into said holes of said disc 40. Said handle 38 may then be rotated so that said prongs will translate said rotation to the rotation of said disc 40. Said rod 20 and said key 32 may be made of a variety of materials that may be easily molded and cheaply produced such as metal or plastic. Said spring 30 should be of the standard helical design and be made out of metal.

Figure 3:
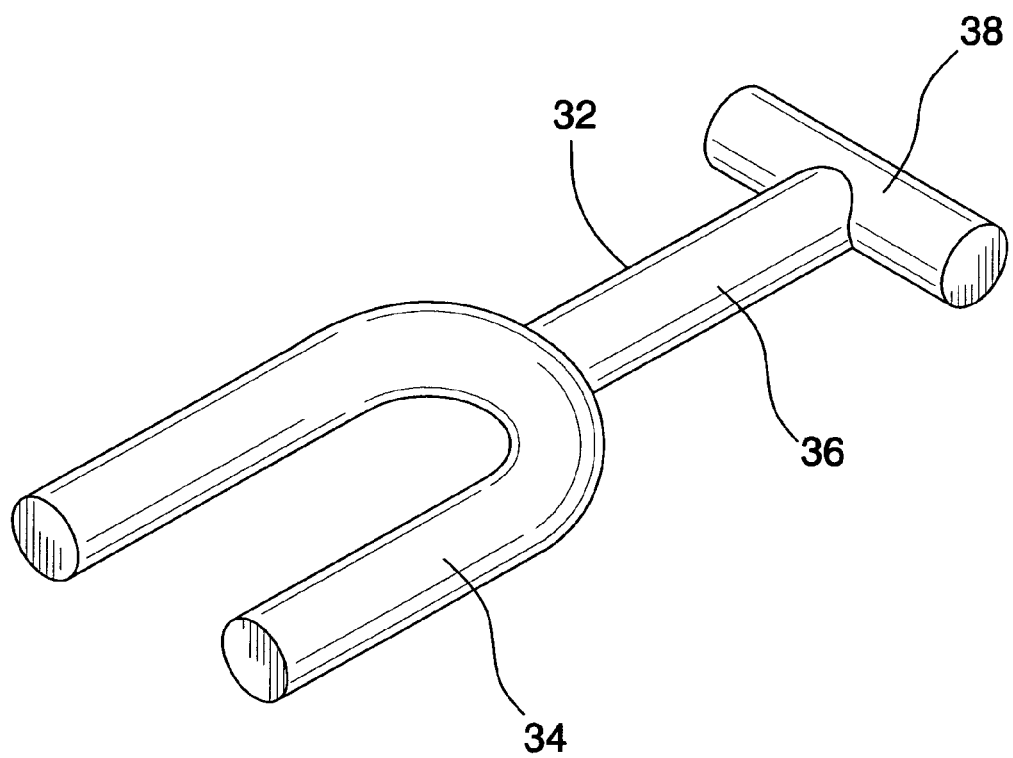
FIG. 3 is a top perspective view of the key of the present invention.

In FIG. 3, said key 32 is illustrated. Said key 32 comprises a cylindrical handle 38 and a rod shaped member 36 wherein the axis of said handle and the axis of said member are perpendicular and said member is attached to the middle of said handle. When the user rotates said handle 38 about said center of said handle said member 36 is rotated about its axis. The opposite end of said member 36 is attached to the base of said U-shaped member 34. If said rod shaped member 36 is rotated then said U-shaped member 34 will also rotate. The user may insert the two prongs of said U-shaped member 34 into said outer holes 26 of said disc 40 when it is desired to apply rotational force. By applying rotational force, the position of said disc 40 may be adjusted as it will move up or down said threads of said port 14 in a screw-like fashion.

Figure 4:
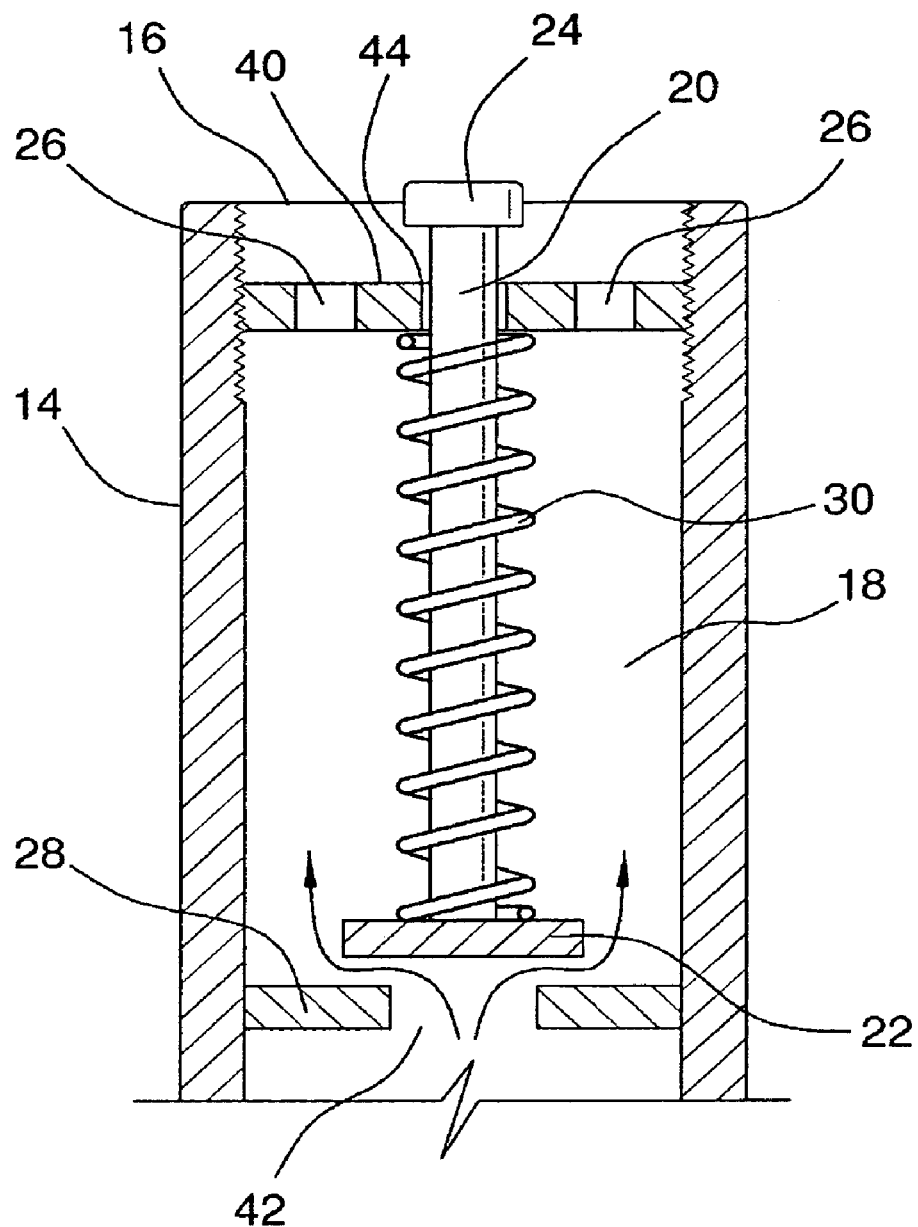
FIG. 4 is a side sectional view of the port of the present invention where the port is not sealed.

When the user wishes to allow air to escape said key 32 may be used to rotate said brace to a higher position as shown in FIG. 4. Said threads on said circumference of said disc 40 are interlocked with said threads on the inner surface of said port 14. The threads are screw-shaped so that rotation causes said disc 40 to be moved. Said higher position will decompress said spring 30, which in turn reduces the force applied by said spring 30 against said plug 22. The reduced force will not resist the force created by air pressure against said plug 22, and air will escape from said hole 42 in said partition 28. Said disc is shown defining two outer holes 26. Said holes 26 receive said prongs of said key 32 so that the user may apply force perpendicular to the radius of said disc 40 creating rotation about the center of said disc. There is a third center hole 44 shown. A rod 20 passes through said center hole 44 and comprises a first end attached to a head 24 and a second end attached to said plug 22. Said spring 30 encircles said rod 20 and is sandwiched between said disc 40 and said plug 22. The contraction between said disc 40 and said plug 22 determines the resistant force of said plug to the force of air pressure.

While a preferred embodiment of the dual outlet air valve 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable flexible material may be used instead of the rubber described for said plug. And although the use for tires has been described, there are slight variations, such as shape and size that would make the invention appropriate for other air retaining devices.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air valve comprising:
   a standard cylindrical valve stem formed to define a bore passing from the interior of an air retaining device to the exterior of said air retaining device and comprising an inner surface along said bore;
   a circular partition mounted on said inner surface of said valve stem wherein said circular partition is formed to define a first and a second circular hole and wherein said circular partition is further formed to have an outer diameter equal to the diameter of said bore in said valve stem;
   a first cylindrical pipe defining a bore having a diameter equal to the diameter of said first hole and mounted on said circular partition so that said bore in said first pipe is aligned with said first hole in said circular partition;
   a second cylindrical pipe defining a bore having a diameter equal to the diameter of said second hole and mounted on said circular partition so that said bore in said first pipe is aligned with said first hole in said circular partition;
   a first cover demountably attached to said first cylindrical pipe so as to seal said first cylindrical pipe; and
   a second cover demountably attached to said second cylindrical pipe so as to seal said second cylindrical pipe.

2. The first cylindrical pipe element of claim 1 wherein the inner surface of said first cylindrical pipe is threaded and the circumference of a first circular cover is threaded so that said first circular cover is demountably attached to said first cylindrical pipe in a screw-like fashion.

3. The second cylindrical pipe element of claim 1 wherein the inner surface of said second cylindrical pipe is threaded and the circumference of a second circular cover is threaded so that said second circular cover is demountably attached to said second cylindrical pipe in a screw-like fashion-4.

4. The air valve of claim 1 comprising a partition wherein said partition is formed to define a center hole and wherein said partition is further formed to have an outer diameter equal to the diameter of said bore in said first pipe and wherein said partition is mounted inside said first pipe and wherein said first cover is held over said hole in said partition.

5. The air valve of claim 1 comprising a partition wherein said partition is formed to define a center hole and wherein said partition is further formed to have an outer diameter equal to the diameter of said bore in said second pipe and wherein said partition is mounted inside said second pipe and wherein said second cover is held over said hole in said partition.

6. The air valve of claim 1 comprising a partition wherein said partition is formed to define a center hole and wherein said partition is further formed to have an outer diameter equal to the diameter of said bore in said first pipe and wherein said partition is mounted inside said first pipe and wherein said air valve comprises a spring wherein said first cover is mounted on said spring and said spring is held so as to hold said first cover over said hole in said partition.

7. The air valve of claim 1 comprising a partition wherein said partition is formed to define a center hole and wherein said partition is further formed to have an outer diameter-equal to the diameter of said bore in said second pipe and wherein said partition is mounted inside said second pipe and wherein said air valve comprises a spring wherein said second cover is mounted on said spring and said spring is secured so as to hold said second cover over said hole in said partition.

8. The air valve of claim 1 comprising a partition wherein said partition is formed to define a center hole and wherein said partition is further formed to have an outer diameter equal to the diameter of said bore in said first pipe and wherein said partition is mounted inside said first pipe and wherein said air valve comprises a spring and a rod wherein said first cover is mounted on said rod and said spring encircles said rod and said rod is secured so as to hold said first cover over said hole in said partition.

9. The air valve of claim 1 comprising a partition wherein said partition is formed to define a center hole and wherein said partition is further formed to have an outer diameter equal to the diameter of said bore in said second pipe and wherein said partition is mounted inside said second pipe and wherein said air valve comprises a spring and a rod wherein said second cover is mounted on said rod and said spring encircles said rod and said rod is secured so as to hold said first cover over said hole in said partition.

10. The air valve of claim 1 comprising a partition wherein said partition is formed to define a center hole and wherein said partition is further formed to have an outer diameter equal to the diameter of said bore in said first pipe and wherein said partition is mounted inside said first pipe and wherein said air valve comprises a spring and a rod wherein said first cover is mounted on said rod and said spring encircles said rod and said rod is secured so as to hold said first cover over said hole in said partition and wherein the inner surface of said first cylindrical pipe is threaded and wherein said air valve further comprises a circular platform formed to define a center hole and a plurality of outer holes and the outer circumference of said circular platform is threaded and mounted on said threads of said inner surface of said first cylindrical pipe and wherein said rod passes through said center hole in said circular platform and said springs rest against the lower surface of said circular platform.

11. The air valve of claim 1 comprising a partition wherein said partition is formed to define a center hole and wherein said partition is further formed to have an outer diameter equal to the diameter of said bore in said second pipe and wherein said partition is mounted inside said second pipe and wherein said air valve comprises a spring and a rod wherein said second cover is mounted on said rod and said spring encircles said rod and said rod is secured so as to hold said second cover over said hole in said partition and wherein the inner surface of said second cylindrical pipe is threaded and wherein said air valve further comprises a circular platform formed to define a center hole and a plurality of outer holes and the outer circumference of said circular platform is threaded and mounted on said threads of said inner surface of said first cylindrical pipe and wherein said rod passes through said center hole in said circular platform and said springs rest against the lower surface of said circular platform.

12. The air valve of claim 1 comprising a partition wherein said partition is formed to define a center hole and wherein said partition is further formed to have an outer diameter equal to the diameter of said bore in said first pipe and wherein said partition is mounted inside said first pipe and wherein said air valve comprises a spring and a rod wherein said first cover is mounted on said rod and said spring encircles said rod and said rod is secured so as to hold said first cover over said hole in said partition and wherein the inner surface of said first cylindrical pipe is threaded and wherein said air valve further comprises a circular platform formed to define a center hole and a plurality of outer holes and the outer circumference of said circular platform is threaded and mounted on said threads of said inner surface of said first cylindrical pipe and wherein said rod passes through said center hole in said circular platform and said springs rest against the lower surface of said circular platform and wherein said air valve further comprises a key comprising prongs aligned to penetrate said outer holes in said circular platform.

13. The air valve of claim 1 comprising a partition wherein said partition is formed to define a center hole and wherein said partition is further formed to have an outer diameter equal to the diameter of said bore in said second pipe and wherein said partition is mounted inside said second pipe and wherein said air valve comprises a spring and a rod wherein said second cover is mounted on said rod and said spring encircles said rod and said rod is secured so as to hold said second cover over said hole in said partition and wherein the inner surface of said second cylindrical pipe is threaded and wherein said air valve further comprises a circular platform formed to define a center hole and a plurality of outer holes and the outer circumference of said circular platform is threaded and mounted on said threads of said inner surface of said second cylindrical pipe and wherein said rod passes through said center hole in said circular platform and said springs rest against the lower surface of said circular platform and wherein said air valve further comprises a key comprising prongs aligned to penetrate said outer holes in said circular platform.

14. An air valve comprising:
  a standard cylindrical valve stem formed to define a bore passing from the interior of an air retaining device to the exterior of said air retaining device and comprising an inner surface along said bore;
  a circular partition mounted on said inner surface of said valve stem wherein said partition is formed to define a first and a second circular hole and wherein said partition is further formed to have an outer diameter equal to the diameter of said bore in said valve stem;
  a first cylindrical pipe defining a bore having a diameter equal to the diameter of said first hole and mounted on said circular partition so that said bore in said first pipe is aligned with said first hole in said partition and wherein said first pipe comprises threads on its inner surface;
  a second cylindrical pipe defining a bore having a diameter equal to the diameter of said second hole and mounted on said circular partition so that said bore in said first pipe is aligned with said first hole in said partition and wherein said second pipe comprises threads on its inner surface;
  a first circular cover comprising threads on its circumference wherein said threads are meshing with said threads of said first cylindrical pipe and said circular cover may be moved by rotating said cover in a screw-like fashion and wherein said cover is formed to define a pair of holes located between the center of said first cover and the circumference of said first cover;
  a second circular cover comprising threads on its circumference wherein said threads are meshing with said threads of said second cylindrical pipe and said circular cover may be moved by rotating said cover in a screw-like fashion and wherein said cover is formed to define a pair of holes located between the center of said second cover and the circumference of said second cover;
  a key comprising a u-shaped member and a cylindrical rod wherein the first end of said rod is mounted on the apex of said u-shaped member having prongs in the opposite direction of said prongs of said unshaped member and wherein said key further comprises a cylindrical handle wherein said handle is mounted at its middle to the second end of said rod so that the axis of said cylindrical handle is perpendicular to the axis of said cylindrical rod and wherein said prongs are separated by the same distance as said pair of holes in said first cover and said pair of holes in said second cover so that said prongs may pass within said pair of holes.

15. The air valve of claim 14 wherein said first circular cover element is formed to define a hole located at the center and wherein said air valve further comprises a wall wherein said wall is formed to define a hole and wherein said wall is attached to the inner surface of said first pipe, and wherein said air valve further comprises a rod passing through said hole in said first cover, a plug attached to said rod and a spring surrounding said rod wherein said spring is held between said first circular cover and said plug and wherein said plug is aligned with said hole in said wall.

16. The air valve of claim 14 wherein said second circular cover element is formed to define a hole located at the center and wherein said air valve further comprises a wall wherein said wall is formed to define a hole and wherein said wall is attached to the inner surface of said second pipe, and wherein said air valve further comprises a rod passing through said hole in said second cover, a plug attached to said rod and a spring surrounding said rod wherein said spring is held between said second circular cover and said plug and wherein said plug is aligned with said hole in said wall.

17. The air valve of claim 14 wherein said first circular cover element is formed to define a hole located at the center and wherein said air valve further comprises a wall wherein said wall is formed to define a hole and wherein said wall is attached to the inner surface of said first pipe, and wherein said air valve further comprises a rod passing through said hole in said first cover, a plug attached to the first end of said rod, a disc-shaped head attached to the second end of said rod, and a spring surrounding said rod wherein said spring is held between said first circular cover and said plug and wherein said plug is aligned with said hole in said wall.

18. The air valve of claim 14 wherein said second circular cover element is formed to define a hole located at the center and wherein said air valve further comprises a wall wherein said wall is formed to define a hole and wherein said wall is attached to the inner surface of said second pipe, and wherein said air valve further comprises a rod passing through said hole in said second cover, a plug attached to the first end of said rod, a disc-shaped head attached to the second end of said rod, and a spring surrounding said rod wherein said spring is held between said second circular cover and said plug and wherein said plug is aligned with said hole in said wall.

19. The air valve of claim 14 further comprising a wall wherein said wall is formed to define a hole and wherein said wall is attached to the inner surface of said first pipe, and wherein said air valve further comprises a pin the first end of which is attached to the center of said first cover, a plug, and a spring the first end of which surrounds said pin and the second end of which is attached to said plug and wherein said spring is held between said first circular cover and said plug and wherein said plug is aligned with said hole in said wall.

20. The air valve of claim 14 further comprising a wall wherein said wall is formed to define a hole and wherein said wall is attached to the inner surface of said second pipe, and wherein said air valve further comprises a pin the first end of which is attached to the center of said second cover, a plug, and a spring the first end of which surrounds said pin and the second end of which is attached to said plug and wherein said spring is held between said second circular cover and said plug and wherein said plug is aligned with said hole in said wall.

* * * * *